Figure 4:
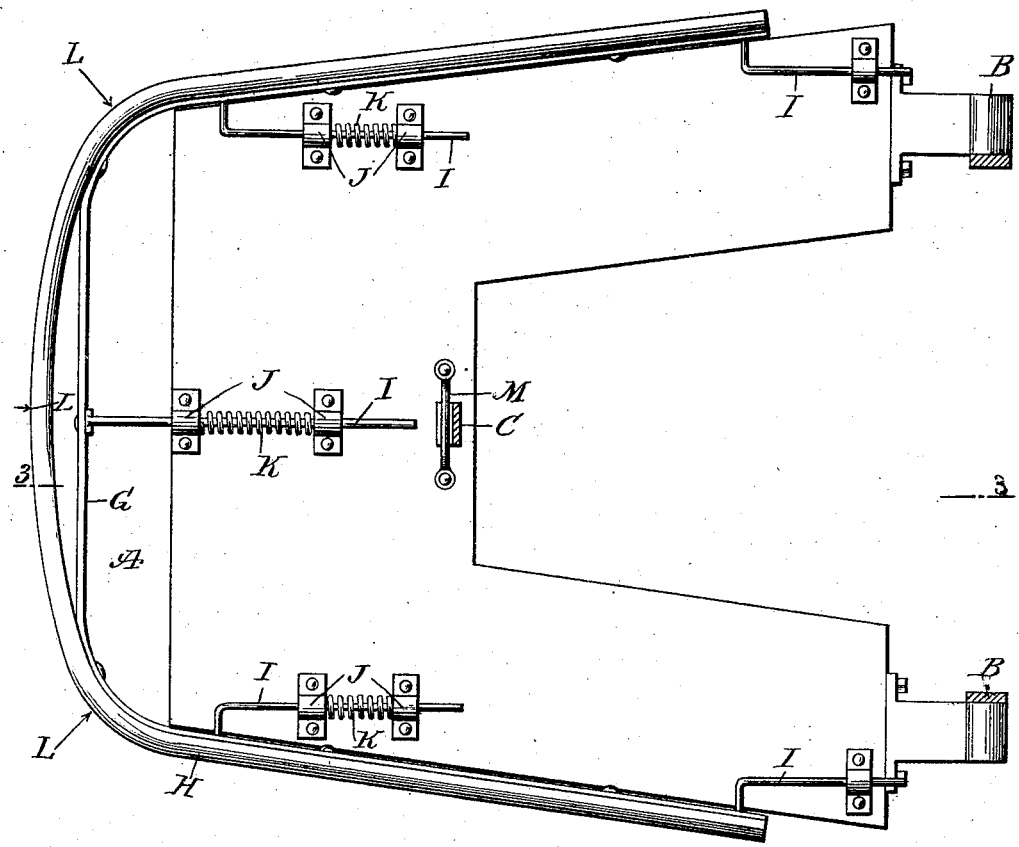

A. FLANDES.
FENDER FOR ELECTRIC CARS AND OTHER MOTOR DRIVEN VEHICLES.
APPLICATION FILED JUNE 3, 1908.
915,580.
Patented Mar. 16, 1909.
2 SHEETS—SHEET 1.
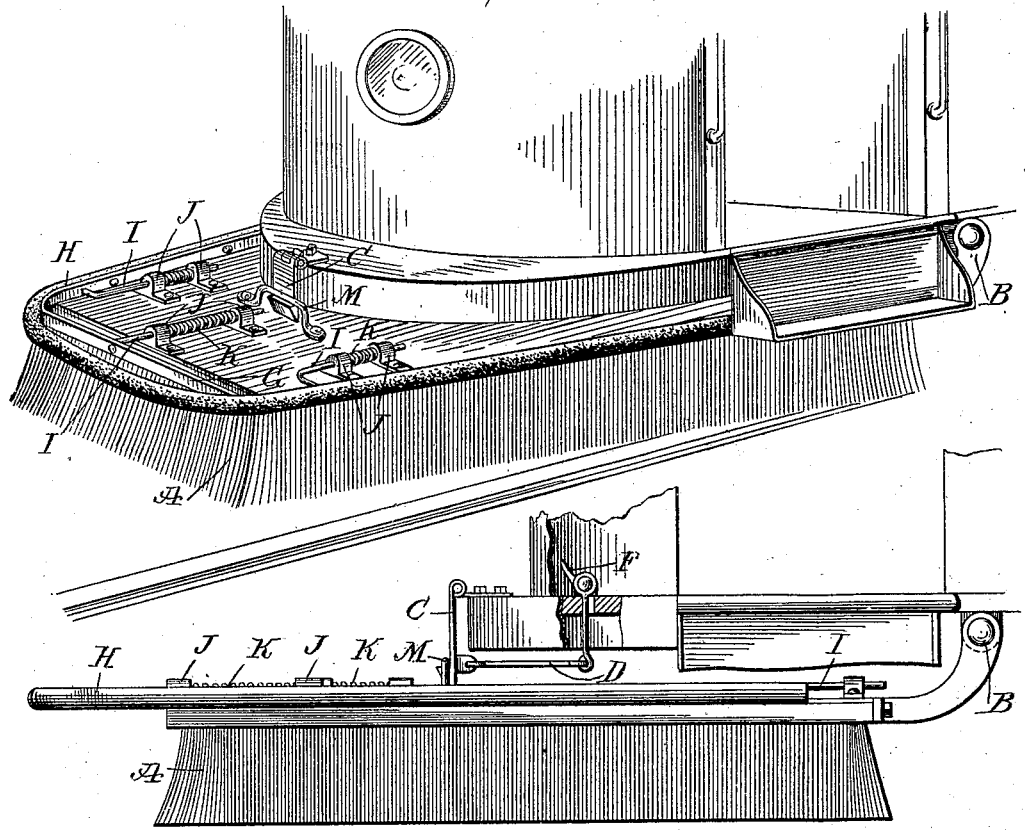
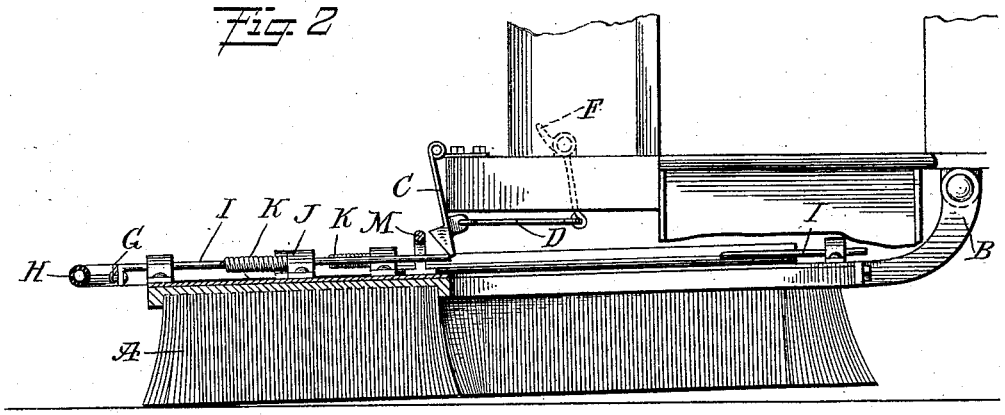
WITNESSES
INVENTOR
Arnulfo Flandes
BY
ATTORNEYS A. FLANDES.
FENDER FOR ELECTRIC CARS AND OTHER MOTOR DRIVEN VEHICLES.
APPLICATION FILED JUNE 3, 1908.

915,580.

Patented Mar. 16, 1909.

2 SHEETS—SHEET 2.

WITNESSES

INVENTOR
Arnulfo Flandes
BY
ATTORNEYS

UNITED STATES PATENT OFFICE.

ARNULFO FLANDES, OF MEXICO, MEXICO.

FENDER FOR ELECTRIC CARS AND OTHER MOTOR-DRIVEN VEHICLES.

No. 915,580.   Specification of Letters Patent.   Patented March 16, 1909.

Application filed June 3, 1908. Serial No. 436,377.

*To all whom it may concern:*

Be it known that I, ARNULFO FLANDES, a citizen of the Republic of Mexico, and a resident of Mexico, Mexico, have invented a new and Improved Fender for Electric Cars and other Motor-Driven Vehicles, of which the following is a full, clear, and exact description.

This invention relates to an appliance to be applied to electric cars, and, in general, to all motor-controlled vehicles.

The objects of the invention are; first, to obtain a safety device that will prevent any obstruction passing under the wheels of the vehicle, thus removing all danger, and, second, to obtain by the means of the same mechanism, a brake which will act effectively as an auxiliary brake to the vehicle so as to stop the same in the shortest possible time without causing shock. To this end I provide in connection with the car or other vehicle, a fender comprising a brush having a pneumatic guard at its margin, the brush being pivotally supported or hinged to the car, and the guard being normally forced outwardly by spring pressure and having means for releasing the brush when the fender is struck and thereby dropping the same to the ground, which prevents the body struck from passing under the wheels, and at the same time checks the movement of the car.

Reference is to be had to the accompanying drawings forming a part of this specification, in which similar characters of reference indicate corresponding parts in all the views.

Figure 1 is a perspective view of the forward portion of a car, having the preferred embodiment of my improvement applied thereto; Fig. 2 is a side elevation of the construction shown in Fig. 1, parts being broken away and in section; Fig. 3 is a sectional side elevation of the same; and Fig. 4 is a plan of the fender.

The brush A constitutes the essential and principal feature of my improved fender. This brush will be of suitable dimensions for each vehicle, and will preferably be made of the roots of sacaton (strong Mexican grass), as I find this material most suitable on account of its elasticity and small cost. The brush A is supported from the vehicle at the rear by means of hinges B, and is maintained in an approximately horizontal position or parallel with the ground by means of a catch C, which, as best shown in Fig. 2, is hinged to the car and engages within a keeper M secured intermediate the length of the brush. The catch C is also connected with a foot lever F through the intermediary of a link D, the lever F being located in a convenient position for operation by the motorman. In the upper part of the brush around its edge or margin is a metallic frame G which supports a pneumatic flexible tube H, ordinarily of rubber. The metallic frame G has guides I arranged at opposite sides and centrally at the front. These guides slide in keepers J, attached to the brush, between which are placed springs K operating to force the frame and the attached pneumatic tube forwardly so that when the pneumatic tube suffers a shock in the direction of the arrows L, the frame G will gently approach the catch C, and by means of the central guide I, force this catch from its keeper, thus permitting the brush to fall to the ground by its own weight, and bringing the car to a stop in the shortest possible time without causing shock. The time required for the brush to drop may be diminished, and the frictional contact of the brush with the ground increased, if desired, by placing a compression spring between the brush and the vehicle. The back of the brush will ordinarily be constructed of one or more metallic plates of suitable weight, with a wood underfacing carrying the bristles of sacaton, the wood being secured to the metal by screws or other equivalent devices.

In the operation of the fender, if the motorman cannot stop the car quick enough by means of the ordinary brake to prevent an accident, he depresses the lever F, which drops the fender and engages the brush with the ground, or if he is negligent, or for other reasons does not operate the lever F before the body is struck, the impact of the blow on the pneumatic tube will force the frame G toward the brush, and by the guides I disengage the catch C from the keeper, which will release the brush before the body has time to pass under it, and thus prevent the victim from passing under the wheels, in addition to acting as a brake, so that the body struck will be dragged the shortest possible distance, suffering only from bruises.

I am aware that prior to my invention, safety car fenders have been made of various constructions; I, however, believe that I am the first to construct such a device embodying a brush which is adapted to be released automatically by the body struck, and serving not only to sweep the body from the wheels but also act in the capacity of an auxiliary brake.

Having thus described my invention, I claim as new and desire to secure by Letters Patent:

1. A car fender comprising a brush, and a cushioned frame arranged at the front of the brush and movably supported thereon.

2. A car fender for motor-driven vehicles, comprising a brush, and a spring-pressed frame arranged at the margin of the brush, provided with a pneumatic cushion.

3. A fender for motor-driven vehicles, comprising a brush, a frame arranged at the sides and front of the brush and slidably supported thereon, means normally forcing the frame forward of the brush, and a pneumatic flexible tube carried by the frame at the outside thereof.

4. The combination of a motor-driven vehicle, a brush supported therefrom, means for automatically releasing the brush by the impact of an obstruction, and manually-operated means for releasing the brush and permitting it to drop to the ground and provide a brake.

5. In combination with a vehicle, a brush pivoted at its rear end to the forward portion of the vehicle, means for supporting the forward portion of the brush above the ground, a marginal frame slidably supported on the brush and normally forced forwardly, and means for releasing the first mentioned means, actuated by the rearward movement of said frame.

6. The combination of a motor-driver vehicle, a brush hinged near one end at the front of the vehicle, a catch for supporting the forward portion of the brush above the ground, from the vehicle, a cushioned frame arranged at the front of the brush, having means for releasing the catch by the impact of an obstruction, and manually-controlled means for operating the catch.

In testimony whereof I have signed my name to this specification in the presence of two subscribing witnesses.

ARNULFO FLANDES.

Witnesses:
 RICARDO SCHOLLES,
 AMADO AQUILERA.